United States Patent
Belmares et al.

(10) Patent No.: US 6,547,868 B1
(45) Date of Patent: Apr. 15, 2003

(54) SCRATCH RESISTANT DISCONTINUOUS ACOUSTICAL SURFACE COATING

(75) Inventors: Hector Belmares, Lancaster, PA (US); Kenneth G. Caldwell, Mountville, PA (US)

(73) Assignee: AWI Licensing Company, Wilmington, DE (US)

(*) Notice: Subject to any disclaimer, the term of this patent is extended or adjusted under 35 U.S.C. 154(b) by 0 days.

(21) Appl. No.: 09/580,692

(22) Filed: May 30, 2000

Related U.S. Application Data

(63) Continuation-in-part of application No. 09/005,386, filed on Jan. 9, 1998, now Pat. No. 6,103,360.

(51) Int. Cl.[7] .............................. C09D 5/00; C09D 7/12; C09D 103/02
(52) U.S. Cl. ................................ 106/217.3; 106/217.2; 106/287.17; 106/DIG. 3; 524/423; 524/425; 524/431; 524/445; 524/446; 524/449
(58) Field of Search ........................... 106/208.3, 217.2, 106/217.3, 287.17, DIG. 3; 524/423, 425, 431, 445, 446, 449

(56) References Cited

U.S. PATENT DOCUMENTS

| | | | | | |
|---|---|---|---|---|---|
| 3,994,845 A | * | 11/1976 | Blachford | ............... | 260/23 R |
| 4,039,492 A | * | 8/1977 | Hamilton | ....................... | 260/8 |
| 4,473,404 A | * | 9/1984 | Eckardt et al. | ................ | 106/84 |
| 5,350,793 A | * | 9/1994 | Kishimoto et al. | ......... | 524/449 |
| 5,674,594 A | * | 10/1997 | Sensenig | .................... | 428/206 |
| 5,869,166 A | * | 2/1999 | Caldwell | .................... | 428/142 |
| 6,103,360 A | * | 8/2000 | Caldwell et al. | ............ | 428/323 |

FOREIGN PATENT DOCUMENTS

EP 0601378 A1 * 6/1994 ............ C09D/5/02

* cited by examiner

*Primary Examiner*—David Brunsman
(74) *Attorney, Agent, or Firm*—Womble Carlyle Sandridge & Rice, PLLC

(57) ABSTRACT

The present invention provides for both a composition and method for producing a scratch resistant coating applied to an acoustical panel. The coating primarily comprises binder, filler and mica and is typically applied as a spray. The coating can be characterized as a discontinuous film, whereby sound can pass through the coating to the panel for attenuating sound. The coating is thus enabled to provide a finish and color without compromising the acoustical performance of the substrate. The process primarily comprises combining and mixing the dry components of filler, binder and mica and then combining the same with water and mixing to create an aqueous mix that can be applied to the acoustical panel and dried.

26 Claims, No Drawings

SCRATCH RESISTANT DISCONTINUOUS ACOUSTICAL SURFACE COATING

CROSS REFERENCE TO RELATED APPLICATION

This application is a continuation-in-part and claims the benefit of U.S. Pat. No. 6,103,360, which issued on Aug. 15, 2000, from U.S. patent application Ser. No. 09/005,386, filed Jan. 9, 1998.

FIELD OF INVENTION

The present invention relates to a scratch resistant acoustical coating for an acoustical panel and more particularly to a scratch resistant discontinuous primer coating for an acoustical panel.

BACKGROUND

As the service sector of the economy grows, more and more workers find themselves in offices rather than in manufacturing facilities. The need for flexible, reconfigurable space has resulted in open plan workspaces, large rooms with reduced height, moveable partitions and suspended ceiling systems. Workstation density is also increasing, with more workers occupying a given physical space. Additionally, speakerphones, conferencing technologies, and multimedia computers with large, sound reflecting screens and voice input tend to increase the noise level of the workplace.

In closed spaces, particularly in office and meeting room settings, speech intelligibility and acoustic performance are determined by a variety of factors, including room shape, furnishings, number of occupants, and especially floor, wall and ceiling treatments. This acoustic environment determines how much sound intrusion occurs as well as the affect on listeners by extraneous noise.

Such acoustical environments are typically modified using acoustical surfaces having sound absorbing qualities. A common sound absorbing surface in a building is found in the acoustic panels used to cover the ceiling, wall or other surface. Acoustic panels are generally composed of porous layers of mineral or vegetable fibers bonded together with non-thermoplastic resins. The panels may also be composed of glass fibers. Acoustic panels are typically provided with substantial porosity to absorb sound waves emanating from within a room. Porosity is evidenced on the surface of the acoustic panels by the presence of small recesses or pores of varying diameter which permit sound waves to enter the material and be dispersed. Additionally, the panels may be acoustically enhanced by mechanical texturing. This texturing produces small holes in the surface of the panel to admit sound which is either dissipated in the interior of the panel or transmitted through the panel.

In the manufacture of acoustical ceiling panels, it is usually necessary to apply colored coatings to the surface of acoustical ceiling panels. Aesthetic finishes are achieved by a combination of texturing and painting the surface of the panel. Achieving a desired coloration of the panel material may require the application of several layers of paint or pigmentation and a primer layer to provide a standard base color and adhesion for additional layers.

The raw materials comprising acoustical panels typically have poor durability and scratch resistance leading to marring of the finished product. To prevent such marring, a coating can be added to provide increased durability to the surface of the panel. Coatings can also be added to limit flammability and flame spread.

Furthermore, moisture and high-humidity can cause a weakening of the material comprising acoustical ceiling panels. This may cause a panel to sag in the middle. Coating one or both surfaces of a panel can both reduce the penetration of moisture into the panel, and impart additional tensile strength to reduce sagging.

Unfortunately, coatings applied to the room-side surface of the panel tend to clog the pores or holes that are necessary for good acoustical performance, thus impairing the acoustical performance of the panel.

Thus, there is a need for a coating that leaves open the sound absorbing pores of an acoustical panel such that there is no appreciable effect on the acoustic performance of a panel. Additionally, there is needed a coating capable of providing a scratch resistant surface to a panel while also providing improved adhesion for applied coatings.

SUMMARY

The present invention provides for both a composition and method for producing a scratch resistant discontinuous primer coating on an acoustical panel. Acoustical panels can be any manufactured surface having sound attenuating properties, such as acoustical ceiling tiles, room partitions or highway barriers.

The applied coating primarily comprises binder, filler and mica and is typically applied as a spray. The coating can be characterized as a discontinuous film, whereby sound can pass through the coating to the panel for attenuating sound.

The coating provides a durable finish and increased handleability along with color without compromising the acoustical performance of the substrate. Handleability is an important aspect of panel durability. Related to handleability are the metrics of Modulus of Rupture (MOR) and Modulus of Elongation (MOE), which relate to the structural integrity of a material, which is also increased by the coating of the present invention.

In more detail, the discontinuous acoustical surface coating of the present invention on a dry weight percent basis comprises about 4 to about 80% mica, about 10 to about 45% binder; and about 10 to about 86% filler. The filler is typically clay and the binder is typically starch.

The process primarily comprises combining and mixing the dry components of filler, binder and mica and then combining the same with water and mixing to create an aqueous mix that can be applied to the acoustical panel and dried.

The method for creating a discontinuous acoustical surface coating comprises the steps of combining and mixing mica, filler and binder to form a dry mix which comprises about 4 to about 80% mica, about 10 to about 45% binder, about 10 to about 86% filler. Then the dry mix can be combined and mixed with water to form a wet mixture that is then sprayed onto the panel to form a coated panel. The components may also be mixed together in one step and then sprayed onto the coated panel. The coated panel is either air dried or heated in an oven.

DETAILED DESCRIPTION

The present invention provides for both a composition and method for producing a scratch resistant coating applied to an acoustical panel. The coating primarily comprises binder, filler and mica and is typically applied as a spray. The coating can be characterized as a discontinuous film whereby sound can pass through the coating to the panel for attenuating sound. Discontinuity is provided by pores formed by the filler component. The coating is thus enabled to provide a finish and color without compromising the acoustical performance of the substrate.

Additionally, the discontinuous acoustical coating primes the surface of the panel. As a primer, the coating adds adhesion between the substrate and successive layers.

In an embodiment, the composition of the coating comprises mica, clay as a filler and starch as the binder. In the coating, mica can comprise from about 4% to about 80% by dry weight of the coating and alternatively between about 4% to 25% by dry weight. In one embodiment, mica comprises about 8% by weight of the coating. Experimentation has indicated that as mica is added in amounts over 80%, the probability of sound permeability of the resulting coating being decreases to an NRC of less than 0.50 at the lower stated application rates increases.

Clay or filler can comprise between about 10% to 86% by dry weight of the coating and alternatively between about 10% to 55% by weight. In one embodiment, the filler comprises about 77% by weight of the coating. The filler is substantially responsible for creating the voids within the coating which allow sound to pass though the coating to the panel where it is dissipated.

Starch or binder can comprise between about 10% to about 45% by weight of the coating and alternatively between 10% to 30% by weight. In one embodiment, starch can comprise about 15% by weight of the coating. The binder or starch is combined with the mica to create the primer coating with significantly improved "finger scratch" results (approximately one to two rating points).

An example of a mica comprising the coating includes Mica 325, available from Franklin Industrial Minerals, of King Mountain, N.C. The average particle size of the mica can range from 20 to 100 150 microns. Additionally, the mica can be surface treated to improve the adhesion of mica to polar substrates. Such surface treatments can include silanes or siloxanes and mixes thereof such as aminopropyltrimethoxysilane and gamma-glycidoxypropyltrimethoxysilane.

An exemplary starch for inclusion within the coating composition includes a cold-dissolvable starch such as Mira-Cap, available from AG Staley Co. of Decatur, Ill. An exemplary material for clay is EG-44 clay, available from Thiele Kaolin Co. of Sanderville, Ga.

Alternative binders may be substituted for starch in whole or in part in the coating composition. Such binders may include polyacrylic acid and its copolymers, protein/epoxy combinations, carboxylated polymer/epoxy combinations and mixtures thereof of such binders. Example polyacrylic acids include Alcosperse 404, available from Alco Chemical of Chattanooga, Tenn. Example protein/epoxy combinations include proteins such as ProCote 184A, available from Protein Technologies of St. Louis, Mo., and epoxies such as Epi-Rez 3522-w-60 from Shell Chemical of Houston, Tex. Example carboxylated polymers/epoxies include Rosin Resin Pentalyn 856, available from Hercules Corp. of Wilmington, Del., and epoxies such as Epi-Rez 3522-w-60 from Shell Chemical of Houston, Tex.

The dry ingredients are combined with a solvent, preferably water, to form a wet mixture. Typically, water can comprise approximately 25% to 90% of the wet mixture and alternatively water can comprise between 43% to 50% of the wet mixture. In one embodiment, water comprises about 46.5% of the wet mixture and the dry ingredients about 53.5% to provide a desired consistency for spraying onto panels.

To prepare a wet mixture that yields a sprayable material that dries with the desired characteristics, additional ingredients, well known in the art, can be utilized. Dispersants, such as Aquaquest 2120, available from GeoSpecialty Chemicals of Charlotte, N.C., can be utilized to aid in the dispersal of included ingredients. Defoamers, such as Tego Foamex 1488, available from Tego Chemie Service, GmbH-Essen Germany, can be utilized to reduce foaming during the mixing process.

In an alternative embodiment, the final wet mixture may have additional ingredients to improve usability and other characteristics not necessarily related to scratch resistance or durability of the coating. For example, in one alternative embodiment, a biocide such as Metasol D3T-A, available from Calgon Corp. of Pittsburgh, Pa., may be added in small amounts (typically less than 1% by weight) to impair bacterial growth. Additionally, a wetting agent such as Tergitol TMN-6, available from Union Carbide, of Danbury, Conn., may be added to improve the wetting of the panel surface and to improve adhesion of the coating.

In an additional embodiment, large, medium, or small particle fillers may be added, including calcium carbonate, limestone, titanium dioxide, sand, barium sulfate, other clays, dolomite, silica, talc, perlite, polymers, gypsum, calcite, aluminum trihydrate, pigments, zinc oxide, and zinc sulfate.

The present process primarily comprises combining and mixing the dry components of filler, binder and mica and then combining the same with water and mixing to create an aqueous mix that can be applied to the acoustical panel. Of course the dry ingredients can be added as a slurry, or in the case of the binder, as a liquid. Typically, the aqueous mix has a viscosity suitable for application using conventional spraying techniques. After the aqueous mix is applied to the panel, it is then dried on the panel to form a scratch resistant coating.

Combining and mixing the dry components typically occurs in a mixer capable of mixing both the dry components and wet components, wherein the process can be a batch or continuous process. The components defined as dry components are labeled such for convenience and it is not implied that such components need to be added dry. For example, clay or filler is commonly added as a slurry and polymer binders are often added as emulsions.

The step of adding a liquid to the dry components is described as a separate step for clarity and it is not meant to limit the present process to such a distinctive step separate from the combining of the other components. Water can be added and mixed simultaneously with the other components of the coating or separately.

The step of applying the coating to the panel is typically done by spraying the wet mixture onto the panel. Other application techniques may also be used, such as the use of rollers or brushes, or dipping.

The step of drying the coating to the panel can either be done at room temperature or at elevated temperatures, such as those found in an oven. When protein/epoxy combinations and carboxylated polymer/epoxy combinations are used as a binder there is a requirement for elevated temperatures. Protein/epoxy combinations typically require that the coated panel be dried at temperatures between 300° F. and 500° F. Carboxylated polymer/epoxy combinations typically require that the coated panel be dried at temperatures between the same temperatures as above.

EXAMPLES

Example 1

An example of the process for preparing the coating of the present invention is illustrated below:

1. Mixing and combining in a mixing vessel the following:
   Water (room temp.) at about 621.15 lbs. or about 28.33% by weight of the mixture.
   Aquaquest 2120 dispersant at about 5.5 lbs., or about 0.25% by weight of the mixture, of which about 2.20 lbs. are solids. The dispersant assists in the dispersion of clay particles within the mixture.
   Tego Foamex 1488 defoamer at about 7.6 lbs., or about 0.35% by weight of the mixture, of which about 1.82 lbs. are solids.
   Mira-Cap Starch at about 191.55 lbs., or about 8.71% by weight of the mixture, of which about 180.06 lbs. are solids.
   EG-44 clay slurry at about 1275 lbs., or about 57.95% by weight of the mixture, of which about 892.5 lbs. are solids.
   Mica 325 at about 99.2 lbs., or about 4.51% by weight of the mixture, of which about 99.1 lbs. are solids.
2. Spraying the wet mixture onto panels at a rate between about 12 and about 26 g/ft.$^2$ or the equivalent dry weight, 6.4–14 g(dry)/ft.$^2$.
3. Drying the coated panel by heating the panel to about 325° F. until dry to form the discontinuous acoustical surface coating.

Within the process, mixing can be performed at room temperature. The resulting wet mixture can be sprayed using conventional spray equipment and drying using conventional oven dried methods. Additionally, no special ventilation is required, and outgassing after manufacturing is minimized since the coating is preferably non-toxic and contains no volatile organic compounds (VOC).

When mixed and applied as indicated, the coating leaves open the sound absorbing pores of an acoustical panel while imparting improved scratch resistance. Scratch resistance is improved by about two scale points on the "finger scratch" test compared with control without mica. The "finger scratch" test or tongue scratch test comprises metal tongues (also called fingers) evenly arranged in a row and securely held at the same level. The tongues are made of steel and are approximately 1.875 inches long and have a thickness which increases going from left to right. The thicknesses are: 10, 12, 14, 16, 18, 20, 22, and 25 mils each. The board to be tested is placed in a holder below the tongues and the tongues are allowed to overlap across the top edge of the board a distance of approximately 7/32 inches. The tongues are then drawn down across the board at a speed of about 20 inches per minute. The thicker tongues more easily scratch the board. Thus, the scratch resistance rating given on the tested board is the thinnest tongue thickness which left a scratch on the board after the tongues were drawn across it.

Furthermore, the coating has low flammability to meet the ASTM E-84 flammability.

Example 2

The same as in Example 1 except that instead of starch as a binder an equivalent amount of a mix of protein ProCote 184A/EpiRez 3522-w-60 in the proportion of 75/25 was used. The finger scratch test showed an improvement of about 2 scale points compared with control without mica.

Example 3

The same as in Example 1 except that instead of starch as a binder an equivalent amount of poly(acrylic acid) Alcosperse 404 was used. The finger scratch test showed an improvement of about 2 scale points compared with control without mica.

Example 4

The same as in Example 1 except that instead of starch as a binder an equivalent amount of a mix of Pentalyn 856/EpiRez 3522-w-60 in the proportion of 75/25 was used. The finger scratch test showed an improvement of about 2 scale points compared with control without mica.

Additionally, once the material of the present invention is applied to a panel, an improved adhesion of color coatings and other paint or pigmentation layers added to the acoustical panel is achieved.

While Applicants have set forth embodiments as illustrated and described above, it is recognized that variations may be made with respect to relative weight percentages of various constituents in the composition. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A scratch resistant discontinuous acoustical surface film on a dry weight percent basis comprising:
   about 4 to about 80% mica;
   about 10 to about 45% binder selected from the group consisting of polyacrylic acid and its copolymers, protein/epoxy combinations, carboxylated polymer/epoxy combinations and mixtures thereof;
   about 10 to about 86% filler,
   wherein the film includes pores formed therein through which sound passes.

2. A composition for forming a scratch resistant discontinuous acoustical surface film, comprising:
   about 4 to about 80% by dry weight mica;
   about 10 to about 45% by dry weight binder;
   about 10 to about 86% by dry weight filler; and
   water in an amount between about 25% to about 90% by weight of the wet composition.

3. The composition for forming a scratch resistant discontinuous acoustical surface film of claim 2, wherein the binder comprises starch.

4. The composition for forming a scratch resistant discontinuous acoustical surface film of claim 2, wherein the filler comprises clay.

5. The composition for forming a scratch resistant discontinuous acoustical surface film of claim 2, wherein the filler is selected from the group consisting of calcium carbonate, limestone, titanium dioxide, sand, barium sulfate and combinations thereof.

6. The composition for forming a scratch resistant discontinuous acoustical surface film of claim 2, wherein the surface of the mica has deposited thereon a compound selected from the group consisting of a silane, a siloxane and mixtures thereof.

7. The composition for forming a scratch resistant discontinuous acoustical surface film of claim 2, further comprising a dispersant.

8. The composition for forming a scratch resistant discontinuous acoustical surface film of claim 2, further comprising a defoamer.

9. The composition for forming a scratch resistant discontinuous acoustical surface film of claim 2, further comprising a biocide.

10. The composition for forming a scratch resistant discontinuous acoustical surface film of claim 2, further comprising a wetting agent.

11. The composition for forming a scratch resistant discontinuous acoustical surface film of claim 2, wherein on a dry weight basis the surface film comprises from about 6 to about 25% mica, about 10 to about 25% binder, and about 50 to about 85% filler.

12. The composition for forming a scratch resistant discontinuous acoustical surface film of claim 2, wherein at least one of the mica, binder and filler, is present in sufficient quantity to improve by 2 units a finger scratch test of an acoustical panel coated with the composition as compared to an acoustical panel coated with a mica-free surface film.

13. A method for creating a discontinuous acoustical surface film comprising:
   forming a wet mixture comprising:
      about 4 to about 80% by dry weight of mica,
      about 10 to about 45% by dry weight of binder,
      about 10 to about 86% by dry weight of filler, and about 25 to about 90% water by weight of the wet mixture;
   applying the wet mixture onto a panel to form a film thereon; and
   forming pores in the film through which sound passes.

14. The method for creating a discontinuous acoustical surface film of claim 13 further comprising the steps of:
   combining and mixing the mica, filler and binder to form a mix,
   combining and mixing the water with the dry mix to form a wet mixture; and
   applying the wet mixture onto a panel to form a coated panel.

15. The method for creating a discontinuous acoustical surface film of claim 13, further including drying the coated panel.

16. The method for creating a discontinuous acoustical surface film of claim 15, wherein the panel is dried at a temperature between about 300° F. and about 500° F.

17. The method for creating a discontinuous acoustical surface film of claim 15, further including covering the dried panel with an organic coating.

18. The method for creating a discontinuous acoustical surface film of claim 13, wherein the dry mix comprises from about 6% to about 25% mica, about 10% to about 25% binder, and about 50% to about 85% filler.

19. A method for creating a discontinuous acoustical surface film, comprising:
   forming a wet mixture comprising;
      about 4 to about 80% by dry weight of mica,
      about 10 to about 45% by dry weight of binder,
      about 10 to about 86% by dry weight of filler, and
      about 25 to about 90% water by weight of the wet mixture; and
   spraying the mixture onto a panel at a rate of between about 12 and about 26 g/ft.$^2$; and
   forming pores in the sprayed mixture through which sound passes.

20. An acoustical ceiling panel comprising a substrate and a surface film with pores through which sound passes, the surface film comprising mica, binder and filler, at least one of which is in sufficient quantity to improve by 2 units a finger scratch test of the ceiling panel as compared to an acoustical panel with a mica-free surface film.

21. The acoustical ceiling panel of claim 20, wherein the surface film comprises on a dry weight percent basis:
   about 4 to about 80% mica;
   about 10 to about 45% binder; and
   about 10 to about 86% filler.

22. The acoustical ceiling panel of claim 20, wherein the filler is selected from the group consisting of clay, calcium carbonate, limestone, titanium dioxide, sand, barium sulfate and combinations thereof.

23. The acoustical ceiling panel of claim 20, wherein on a dry weight percent basis the surface film comprises from about 6 to about 25% mica, about 10 to about 25% binder, and about 50 to about 85% filler.

24. The acoustical ceiling panel of claim 20, wherein the surface film forms an outer surface.

25. The acoustical ceiling panel of claim 20, wherein the surface film is a primer layer, and further comprising an additional paint layer adjacent the primer layer.

26. An acoustical panel comprising a substrate and a surface film with pores through which sound passes, the surface film comprising mica, binder and filler, at least one of which is in sufficient quantity to improve by 2 units a finger scratch test of the panel as compared to an acoustical panel with a mica-free surface film, wherein the binder is selected from the group consisting of polyacrylic acid and its copolymers, protein/epoxy combinations, carboxylated polymer/epoxy combinations and mixtures thereof.

* * * * *